US012730353B2

(12) United States Patent
Kaneda et al.

(10) Patent No.: US 12,730,353 B2
(45) Date of Patent: Sep. 8, 2026

(54) LIGHT GENERATING APPARATUS AND METHOD

(71) Applicant: ARIZONA BOARD OF REGENTS ON BEHALF OF THE UNIVERSITY OF ARIZONA, Tucson, AZ (US)

(72) Inventors: Yushi Kaneda, Tucson, AZ (US); Adoum Mahamat, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 19/122,827

(22) PCT Filed: Oct. 19, 2023

(86) PCT No.: PCT/US2023/077250
§ 371 (c)(1),
(2) Date: Apr. 21, 2025

(87) PCT Pub. No.: WO2024/147833
PCT Pub. Date: Jul. 11, 2024

(65) Prior Publication Data

US 2026/0010052 A1 Jan. 8, 2026

Related U.S. Application Data

(60) Provisional application No. 63/417,425, filed on Oct. 19, 2022.

(51) Int. Cl.
*G02F 1/35* (2006.01)

(52) U.S. Cl.
CPC ........ *G02F 1/3503* (2021.01); *G02F 2203/26* (2013.01)

(58) Field of Classification Search
CPC ........................... G02F 1/3503; G02F 2203/26
See application file for complete search history.

(56) References Cited

U.S. PATENT DOCUMENTS

| | | | | |
|---|---|---|---|---|
| 9,172,206 | B2 * | 10/2015 | Ota | H01S 3/06754 |
| 10,095,083 | B2 | 10/2018 | Kaertner et al. | |
| 10,866,486 | B2 * | 12/2020 | Mueller | G02F 1/3551 |

(Continued)

FOREIGN PATENT DOCUMENTS

| | | | |
|---|---|---|---|
| CN | 103605249 | B | 4/2016 |
| CN | 108873558 | A | 11/2018 |
| WO | 2024/147833 | A1 | 7/2024 |

OTHER PUBLICATIONS

International Search Report and Written Opinion of Related PCT/US2023/077250, mailed Jun. 19, 2024, 9 pages.

(Continued)

*Primary Examiner* — Rhonda S Peace
(74) *Attorney, Agent, or Firm* — Quarles & Brady LLP; Yakov S. Sidorin

(57) ABSTRACT

Methodology of ensuring that a phase-matching condition for non-linear interaction between constituent optical waves interacting with one another in a non-linear medium is satisfied for and at substantially every frequency (or wavelength) of the spectral bandwidths of such optical waves, thereby increasing the efficiency of the non-linear process.

20 Claims, 5 Drawing Sheets

(56) References Cited

U.S. PATENT DOCUMENTS

| | | | | |
|---|---|---|---|---|
| 2003/0084837 | A1* | 5/2003 | Lee | G02F 1/3558 117/948 |
| 2009/0161202 | A1* | 6/2009 | Kong | G02F 1/39 359/345 |
| 2009/0251769 | A1* | 10/2009 | Kong | G02F 1/39 359/345 |
| 2011/0297651 | A1* | 12/2011 | Squier | B23K 26/0624 359/569 |
| 2020/0333684 | A1* | 10/2020 | Prasad | G02F 1/3551 |

OTHER PUBLICATIONS

Vicario et al. “High-energy deep-UV temporal pulse shaping by chirp-assisted broadband frequency conversion,” CLEO/Europe and EQEC 2011 Conference Digest. May 30, 2011 (May 30, 2011). Retrieved on Jun. 11, 2024. Retrieved from <URL: https://opg.optica.org/ abstract.cf m ?uri=CLEO _Europe-2011-CD2_2> entire document. 1 page.

* cited by examiner

LIGHT GENERATING APPARATUS AND METHOD

CROSS-REFERENCE TO RELATED APPLICATIONS

This US Patent Application is a national phase of the International Patent Application No. PCT/US2023/077250 filed on Oct. 19, 2023 and now published as WO 2024/147833, which claims priority from and benefit of the U.S. Provisional Patent Application No. 63/417,425 filed on Oct. 19, 2022. The disclosure of each of the above-identified patent documents, is incorporated herein by reference.

STATEMENT REGARDING FEDERALLY SPONSORED RESEARCH OR DEVELOPMENT

This invention was made with government support under Grant No. N68335-21-C-0133 awarded by NAVY/Office of Naval Research. The government has certain rights in the invention.

TECHNICAL FIELD

The present invention relates to methodologies of increasing the efficiency of non-linear optical processes and, in particular, to a methodology of increasing the efficiency of conversion of optical frequency by ensuring that phase-matching condition is satisfied for and at substantially every constituent optical frequency present within the bandwidths of non-linearly interacting chirped pulses of light.

RELATED ART

Spectral content of laser radiation can be changed and/or expanded by conversion of laser light at existing frequencies to various other spectral ranges using the non-linear optical methods. For example, the IR laser light can be converted to the visible and UV ranges by sequential generation of the second and fourth harmonics. However, practical challenges persist in efficient harmonic wavelength conversion when the spectral bandwidth of the input laser beam is broad. Indeed, often for frequency conversion the linearly chirped IR laser1 pulses (sometimes stretched to a duration of several tens of picoseconds with a rather broad spectrum (for example, of about 10 nm) are used, which complicates and limits the efficiency of the generation of optical harmonics because, understandably, the required phase-matching condition in the employed non-linear medium is not satisfied for various frequencies present in the spectral bandwidth of the pulses (for practical purposes—except for the chosen target optical frequency). A solution alleviating this problem for a specific case of the second-harmonic frequency generation as proposed in I. V. Kuzmin, et.al. (Appl. Opt. 60, 3128-3135, 2021) includes non-collinear interaction of two beams of IR light the pulses of which have substantially equal in magnitude chirp rates of opposite signs, so that at any given time the sum of the two frequencies remains substantially while the spectral bandwidth of the generated harmonic is comparatively narrow.

Clearly, the solution(s) proposed by related art is/are too specific and there remains a need to address this problem for multiplicity of practical situations, including those in which the interacting pulses of light are not necessarily harmonically related to one another and/or those in which the chirp rates are not necessarily equal in magnitude.

SUMMARY OF THE INVENTION

An embodiment of the present invention provides an optical system that includes a) an input non-linear optical medium positioned across the input axis and configured to receive and transform, in transmission therethrough, a portion of light carried by first chirped pulses of light (at a first nominal wavelength) into second chirped pulses of light at a second nominal wavelength; b) a pulse compressor system including at least one pulse compressor that is configured to receive one chosen of the first chirped and second chirped pulses of light but not the other of these first chirped and second chirped pulses of light and to over-compress such chosen pulse of light to form, at an output of the pulse compressor system, over-compressed chirped pulse of light having a chirp direction opposite to that of the first chirped pulse of light. The optical system further includes a first optical sub-system configured to spatially overlap a beam carrying the over-compressed chirped pulse of light with a beam carrying the other of the first chirped and second chirped pulses of light and with an output axis at multiple points of the output axis; and a second optical sub-system configured to synchronize times of arrival of the over-compressed pulses of light and of the other of the first chirped and second chirped pulses of light at a chosen location at the output axis. In at least one implementation, the optical system may be configured to additionally include an output non-linear optical medium positioned across the output axis at said chosen location, and/or the pulse compressor system may be configured such as to ensure that a chirp rate of the over-compressed chirped pulses of light and a chirp rate of the other of the first chirped and second chirped pulses of light are substantially equal at least at said chosen location. Alternatively or in addition, and substantially in every embodiment, the optical system may be configured to maintain a phase-matching condition in a region of interaction of the over-compressed chirped pulses of light and the other of said first chirped and second chirped pulses of light with the output non-linear optical medium substantially at every instant of time within a duration of at least one of said chirped pulses. Alternatively or in addition, and substantially in every implementation, the optical system may include a third optical sub-system configured to spatially separate the first chirped pulses of light from the second chirped pulses of light and disposed between the input non-linear optical medium and the at least one pulse compressor.

Embodiments of the invention also provide a method for transforming light, which in one specific implementation can be performed with the specific use of an embodiment of the optical system alluded to above. Generally, such method includes the following steps performed with the use of a first temporally chirped pulse of light (characterized by a first pre-defined nominal optical wavelength, a first rate of chirp, and a first chirp directionality) and with the use of a second temporally chirped pulse of light (characterized by a second pre-defined nominal optical wavelength, a second rate of chirp, and a second chirp directionality): a step of over-compressing a chosen pulse of the first and the second pulses in a pulse de-chirping system to form an over-compressed pulse with an over-compressed pulse chirp directionality that is opposite to a directionality of the chosen pulse; and a step of spatially adjusting directions of propagation of corresponding beams of light that carry, respectively, the over-compressed pulse and the other of the first and second pulses, with a chosen axis to have such beams of light substantially spatially coincide with said axis at multiple points thereof. These steps are performed in the process of (that is, while) temporally synchronizing the over-compressed pulse and the other of the first and second pulses such as to have these pulses spatially and temporally overlap at a chosen location on the axis. In at least one embodiment, the method includes—when an over-compressed chirp rate of the over-compressed pulse and a chirp rate of the remaining of the first and second pulses are not equal to one another—a process or step of varying at least one of the over-compressed chirp rate and the chirp rate of the other of the first and second pulses to make magnitudes of these chirp rates substantially equal to one another. (When the step of varying is performed, such step of varying may include passing the other of the first and second pulses through an auxiliary pulse de-chirping system that is independent from the pulse de-chirping system or transmitting the other of the first and second pulses through a material possessing chromatic dispersion.) Alternatively or in addition—and substantially in every implementation—the method may additionally include generating a third pulse of light (at the chosen location) by non-linearly interacting the over-compressed pulse with the remaining of the first and second pulses. (In the embodiment where such step of generating is performed, the method may additionally include a step of transmitting the over-compressed pulse of light and the other of the first and second pulses of light through an output non-linear optical medium positioned across the axis at the chosen location.) Alternatively or in addition—and substantially in every implementation—the method may additionally include a step of generating the second pulse of light by interacting the first pulse of light with an input non-linear optical medium positioned in front of the pulse de-chirping system (in which case, optionally, the method may also include a step performed prior to over-compressing and manifesting in spatially separating light beams carrying, respectively, the first and second pulses of light). Alternatively or in addition—and substantially in every implementation of the method—the first pre-determined optical wavelength, the second pre-determined wavelength, and a third nominal optical wavelength of the third pulse of light may be chosen to be, respectively, a fundamental harmonic of a chosen optical frequency, a second harmonic of the chosen optical frequency, and a third harmonic of the chosen optical frequency. In every implementation of the method, optionally, the step of spatial adjusting may include interaction corresponding pulses of light with at least one dichroic beamsplitter and/or the step of temporally synchronizing the over-compressed pulse and the other of the first and second pulses may include introducing a corresponding time delay in a path of propagation of at least one of the over-compressed pulse and the other of the first and second pulses. Alternatively or in addition, and substantially in every implementation of the method, the step of over-compressing may include transmitting the chosen pulse through a grating compressor (in which case, the method may optionally include an additional step of reflecting light from the chosen pulse at a repositionable reflector).

BRIEF DESCRIPTION OF THE DRAWINGS

The idea and implementations of the invention will be more fully understood by referring to the following Detailed Description of Specific Embodiments in conjunction with the not-to scale Drawings, of which.

Figure 1:
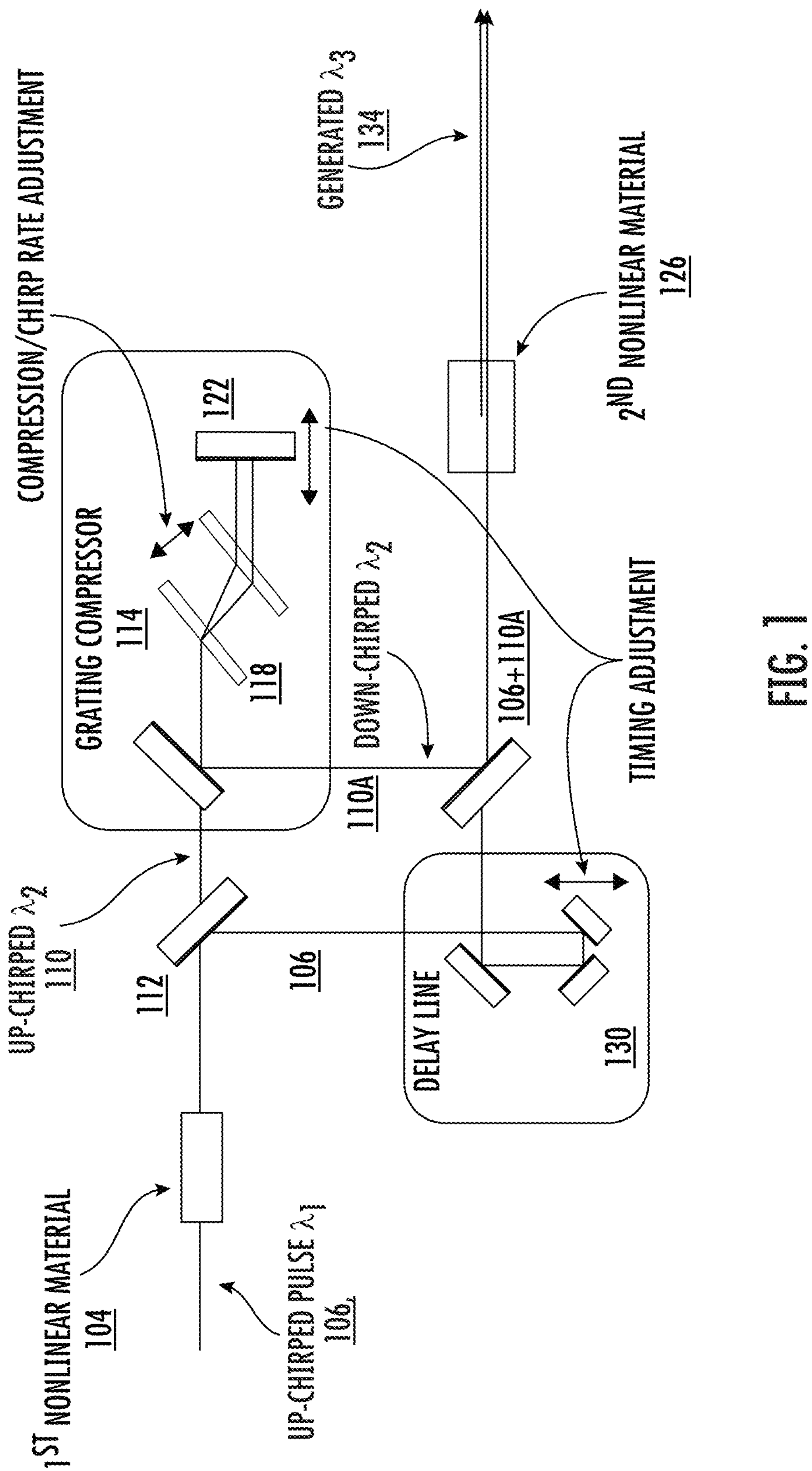
FIG. 1 is a schematic of an optical system according to an embodiment of the invention.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

In accordance with embodiments of the present invention, methods and apparatus are disclosed for addressing a rather common in related art practical situation in which relatively broad bandwidths of chirped pulses of light (which pulses are used for the non-linear frequency generation via interaction with one another in a non-linear medium) limit the efficiency of the involved non-linear processes. More specifically, the problem of inability of related art to achieve the phase-matching condition for non-linear generation of optical energy at every constituent frequency that is present within the spectral bandwidths of the co-directionally chirped pulses of light (carried by respective multiple beams of light propagating through and interacting at a non-linear crystalline materials collinearly) is solved by not only reversing the direction of chirp in one of the interacting pulses as compared with that in another, but also—when the chirp rates of the interacting pulses are not substantially the same (which may be the case when the interacting light pulses are not harmonically related with one another)—adjusting at least one of the respective chirp rates and colinearly overlapping the corresponding beams of lights. As a result of such light transformation, the substantially complete phase-matching becomes practically possible substantially at every constituent frequency of the chirps of the interacting pulses of light.

Prior to discussing the essence of the idea of the invention in detail, some introductory notes are in order:

The temporal chirp of a light pulse is usually understood as the time dependence of its instantaneous frequency (and is so defined for the purposes of this disclosure). Specifically, an up-chirp (down-chirp) means that the instantaneous frequency rises (decreases) with time.

The term "directionality of a chirp" (or "direction of a chirp") is defined herein as a characteristic of an up-chirp or a characteristic of a down-chirp. As a skilled person will readily understand, the chirp of an up-chirped pulse and the chirp of a down-chirped pulse have opposite chirp directions (or chirp directionalities).

The term "magnitude of a chirp" (or, interchangeably, "the rate of chirp" or "the chirp rate") is defined as the rate of change in the instantaneous optical frequency (or optical wavelength), e.g. in units of Hertz (or units of nm) per second.

The un-chirped pulse of light is referred to as a transform-limited pulse of light (for which, generally, the time-bandwidth product is substantially at its minimum, and the pulse can be considered to be as short as possible under the circumstances).

As is recognized in related art, a duration of a chirped pulse of light can be reduced by removing (or at least reducing) the chirp, that is by flattening the distribution of the spectral phase. To put it differently, the reduction of the chirp rate characterized by a certain direction is associated with the reduction of duration of the pulse. In one case, such de-chirping can be accomplished by passing the chirped pulses through, for example, a linear optical system with a suitable amount of chromatic dispersion. Such system, generally referred to herein as a pulse de-chirping system, may be represented for example by a pair of diffraction gratings (referred to in this case a s a grating compressor), a chirped mirror, a chirped fiber Bragg grating, or a volume Bragg grating, as known in related art. When the chirp of certain duration is reduced to substantially zero—for example, with the use of a grating compressor—the pulse of light is transformed un-chirped pulse of light.

For the purposes of this disclosure—and unless expressly stated otherwise—the process of over-compression of the chirped pulse of light is defined as a (continuous or step-wise) process of compression of an initial pulse (performed without no reversal) accompanied by such manipulation of the chirp rate (of a given initial directionality) as a result of which the initial chirp rate is a) first reduced substantially to zero (while the initially chirped pulsed of light becomes a transform-limited pulse of light) and then b) increased again, but now with an opposite directionality of a chirp. As a skilled artisan will now understand that as a result of over-compression of the chirped pulse of light the directionality of the chirp is reversed.

In the example discussed below, for the purpose of UV light generation at about 355 nm (which is close to the third harmonic of the fundamental wavelength of about 1065 nm), the beam of green (second-harmonic) light and the fundamental IR beam are manipulated so that the constituent pulses of light have opposing chirp signs but not necessarily the same rates of being chirped for the constant frequency of the sum of the two. The chirp rate is determined to satisfy the sum-frequency mixing process in the particular nonlinear material used as the frequency mixer. While the discussion below is presented only the case of IR, green, and UV wavelengths, the skilled artisan will readily appreciate that this example shall not limit the scope of the invention to these specific spectral regions.

Example of an Embodiment of the Invention

In one non-limiting case, nonlinear optical frequency conversion may be based on harmonic conversion or sum-frequency mixing in a nonlinear crystal with phase-matching condition. Phase-matching condition manifests in this case in matching the phase velocity of the driving participating optical waves (which in this example are the waves representing IR light and green light), with that of the generated (harmonic, output) wave, which is the UV light.

$$k_1 + k_2 = k_3 \tag{1}$$

where $k_1$, $k_2$ and $k_3$ represent the wave vectors of interacting optical waves 1, 2 (two input photons), and optical wave 3 (generated harmonic), respectively. This can be also written as $$n_1\omega_1 + n_2\omega_2 = n_3\omega_3 \tag{2}$$

also from conservation of energy point of view, as $\omega_1+\omega_2=\omega_3$.

In reference to the schematic of the embodiment of the laser (optical) system 100 of FIG. 1, when the fundamental harmonic (the IR light) laser pulse is chirped, so that $\omega_1$ (and, accordingly, $\lambda_1$) sweeps in time, the green light at $\omega_2$ (having the wavelength of $\lambda_2$), which is generated from light at the fundamental frequency $\omega_1$ in the non-linear crystal 104, is also chirped for that reason and in the same direction. (shown in the example of FIG. 1 as "up-chirped"). That is, the light 110 generated by passing the fundamental harmonic laser pulse of light 106 through the non-linear crystal 104 is also up-chirped.

The non-linearly interacting chirped IR light 106 and chirped green light 110 are then spatially separated by, for example, a dielectric reflector/beamsplitter 112. At least one of the beams 106, 110 (here, as shown, the second-harmonic beam 110) can be sent to a compressor 114, which includes a combination of a grating pair 118 and retroreflector 122. By varying the distance between the gratings of the grating pair 118, the degree of compression of the pulses of light 110 is changed and, therefore, the chirp rate of the resulting pulses (of green light 110, in this example) is adjusted as well. In particular, the distance between the two gratings of the pair 118 can be substantially increased so that the resulting pulse is "compressed" beyond the transform limited, in which regime the direction of the chirp of the light 110 is reversed, thereby causing the light pulse in the beam 110 to be "over-compressed" to reverse the sign of the rate of chirp (shown at the exit of the grating compressor 118 as a "down-chirped" beam 110A).

The timing of the arrival of the pulses of the beams 106, 110A at another non-linear medium 126 of the optical system of FIG. 1 is judiciously adjusted, as shown, with the use of a delay-line 130, to synchronize the pulses of light 106, 110A to have these pulses overlap and collide at the second nonlinear material 126 while being combined collinearly. (It is appreciated that in a related embodiment, the beam 106 with light at $\lambda_1$—or even both beams 106, 110A) can be passed through the delay line 130). As a result, properly synchronized pulses with relatively adjusted chirp rates generate light at yet another frequency (in this example—the sum-frequency at $\lambda_3$, shown as beam of light 134) efficiently in the substantially-completely phase-matched interaction in the non-linear crystal 126.

In the considered example, since light 134 at the sum-frequency is not harmonically related to either light of the beam 106 or light of the beam 110A, the resulting sum-frequency of the light 134 does not remain constant and the chirp rate of the beam 134 at $\lambda_3$ is smaller (and substantially equal to the sum of the chirp rates of the beams 106, 110A, which chirp rates are opposite in signs).

In order to maintain the phase-matching condition, frequency $\omega_2$ of light of the beam 110 is swept in such a way that the condition expressed by Eq. (2) is maintained. This condition varies from one material/phase-matching configuration to another, and can be determined on a situation-by-situation basis. Below four non-limiting situations are considered (which includes consideration of two different materials and two different phase-matching type-I/type-II configurations) and discussed.

The determination of chirp rate is obtained from solving $$n(\omega_1)\omega_1 + n(\omega_2)\omega_2 = n(\omega_1+\omega_2)(\omega_1+\omega_2) \tag{3}$$

for $\omega_2$ at a given $\omega_1$ and determining the rate of a change of the solution in $\omega_2$ as compared to the rate of change in $\omega_1$. (It was determined that the change in $\omega_2$ with respect change in $\omega_1$ is substantially linear in the range of optical frequencies of interest, and most of the time the refractive indices are provided by the well-known Sellmeier equation as function of wavelength. Accordingly, the following discussion is presented in terms of wavelength, for the sake of simplicity of presentation.)

The Eq (3) becomes:

$$\frac{n(\lambda_1)}{\lambda_1} + \frac{n(\lambda_2)}{\lambda_2} = \left(\frac{1}{\lambda_1} + \frac{1}{\lambda_2}\right) n\left(\frac{1}{\frac{1}{\lambda_1} + \frac{1}{\lambda_2}}\right) \tag{4}$$

The actual indices in Eq. (4) are those corresponding to the particular polarization of light and spatial orientation of the non-linear crystal with respect to the vectors of polarization.

The skilled in the art person now appreciates, therefore, that one embodiment of the optical system of the invention may be judiciously structured; an input non-linear optical medium positioned across the input axis and configured to transform a portion of light carried by first chirped pulses of light (which are characterized by a first nominal wavelength and received by the input non-linear optical medium along the input axis) into second chirped pulses of light at a second nominal wavelength; a pulse compressor system including at least one pulse compressor that is configured to receive one of the first chirped and second chirped pulses of light—but not the other of said first chirped and second chirped pulses of light—and to over-compress the received chirped pulses of light to form, at an output of the pulse compressor system, over-compressed chirped pulses of light that have a chirp direction opposite to that of the first chirped pulses of light; a first optical sub-system configured to spatially overlap a beam carrying the over-compressed chirped pulses of light with (a) a beam carrying the other of said first chirped and second chirped pulses of light and with (b) an output axis at multiple points of the output axis; and a second optical sub-system configured to synchronize a time of arrival of the over-compressed pulses of light and a time of arrival of the other of said first chirped and second chirped pulses of light at a chosen location, the chosen location being at the output axis. While optional, the optical system may also include a source of light (configured to generate the first chirped pulses of light at a first nominal wavelength and direct such first chirped pulses along the input axis).

One implementation of methodology of light transformation according to the idea of the invention may at least in one specific case be optionally performed with the use of the embodiment of the optical system alluded to above and generally includes, accordingly, (i) transformation of a first temporally chirped pulse of light (characterized by a first nominal optical wavelength, and first rate of chirp, and a first chirp directionality) to a modified first temporally chirped pulse of light (characterized by the first nominal optical wavelength, a modified fist chirp rate, and a modified first chirp directionality that is opposite to the first chirp directionality); (ii) generation of a second temporally chirped pulse of light (characterized by a second nominal optical wavelength, a second rate of chirp, and a second chirp directionality that is equal to the modified first chirp directionality by interacting the first pulse of light with an input non-linear optical medium); and (iii) spatial adjustment of directions of propagation of corresponding beams of light (that carry, respectively, light of the modified first chirped pulse and light of the second chirped pulse) with respect to a chosen axis to have these beams substantially spatially coincide with the axis at multiple points thereof while temporally synchronizing the modified first chirp pulse and the second chirp pulse such as to spatially and temporally overlap these pulses at a chosen location on the axis.

Example of Type-I Phasematching in LBO ($LiB_3O_5$)

LBO is a recognized choice of material when it comes to the generation of light in the vicinity of 350 nm. The nominal phase-matching angle for propagation of IR light 106 at about 1065 nm and green light 110A at about 532.5 nm to generate light 134 at about 355 nm is θ=90 deg., φ=37.2 degrees, both the IR light 106 and green light 110A are substantially linearly polarized along the Z crystalline axis, and the resulting UV light 134 (λ3=(1/λ1+1/λ2)−1) is polarized in the XY plane. Therefore, the index for the UV is given by $$\sqrt{\frac{\mathrm{Cos}^2(\phi_{PM})}{n_y(\lambda_3)^2} + \frac{\sin^2(\phi_{PM})}{n_x(\lambda_3)^2}}^{\,-1} \tag{5}$$

where $\varphi_{PM}$ is 37.1 degrees, which corresponds to the phase-matching orientation.

Along the spatial axis defined by $\varphi_{PM}$=37.1 degrees, the phasematching wavelength $\lambda_{2PM}$ for the UV generation can be found as a function of $\lambda_1$.

Figures 2, 3:
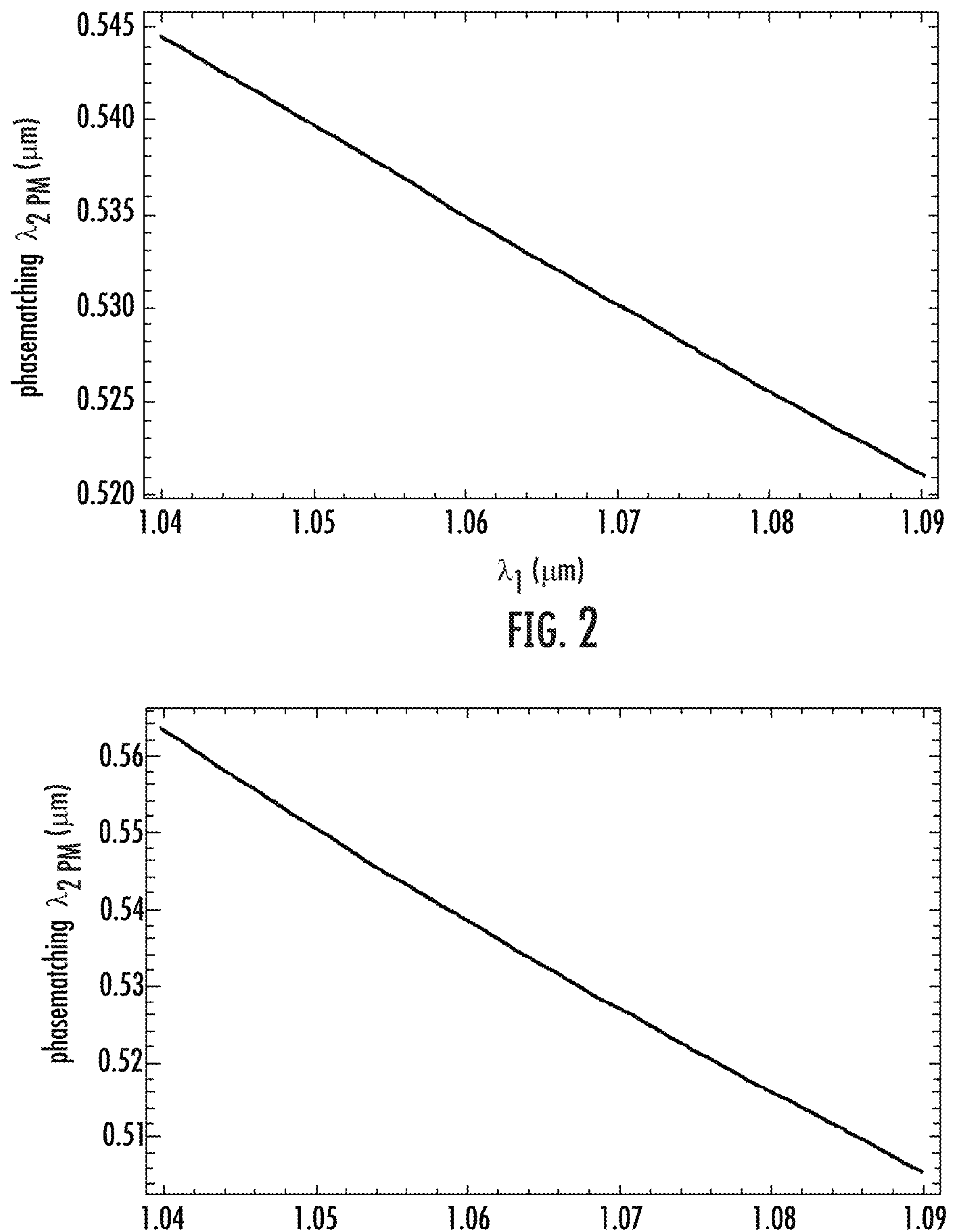
FIG. 2 is a plot representing variation of a phase-matching wavelength of the second optical wave as the function of the wavelength of the first optical wave for non-linear interaction in type-I LBO crystal.
FIG. 3 is a plot representing variation of a phase-matching wavelength of the second optical wave as the function of the wavelength of the first optical wave for non-linear interaction in type-II LBO crystal.

With the use of the Sellmeier equation (see K. Kato, JQE 30, p. 2950, 1994, for example), the phase-matching wavelength $\lambda_{2PM}$ was determined and plotted in FIG. 2 2. This plot represents a corresponding chirp rate of the pulse of the green light 110A that has sign opposite to the sign of the chirp rate of the IR pulse 106, and that is 0.47× of the magnitude of the chirp rate of the IR pulse 106:

$$\frac{\partial \lambda_{2PM}}{\partial \lambda_1} = -0.47$$

This result is of significance, as the chirp rate is not the same, or even harmonically related. Therefore, while the frequency (wavelength) of the UV light 134 does not remain constant and is chirped, the phase-matching condition remains met.

Example of Type-II Phasematching in LBQ

This configuration is more frequently encountered in practice, as the green light 110 generated in the SHG process at the crystal 104 is typically polarized perpendicularly to the direction of polarization of the fundamental harmonic of the IR light 106. Nominal phase-matching for 355 nm occurs at θ=42.4 degrees and φ=90 degrees, with the IR and UV portions of light 106, 134 polarized along the X-axis and green light 110A polarized in the YZ plane. In this case, the phase-matching wavelength $\lambda_{2PM}$ is calculated and plotted in FIG. 3.

Here, the corresponding chirp rate for green light 110A is larger in magnitude (as compared to that of the previous example):

$$\frac{\partial \lambda_{2PM}}{\partial \lambda_1} = -1.14$$

Example of Type-I Phasematching in BBO ($BaB_2O_4$)

Figures 4, 5:
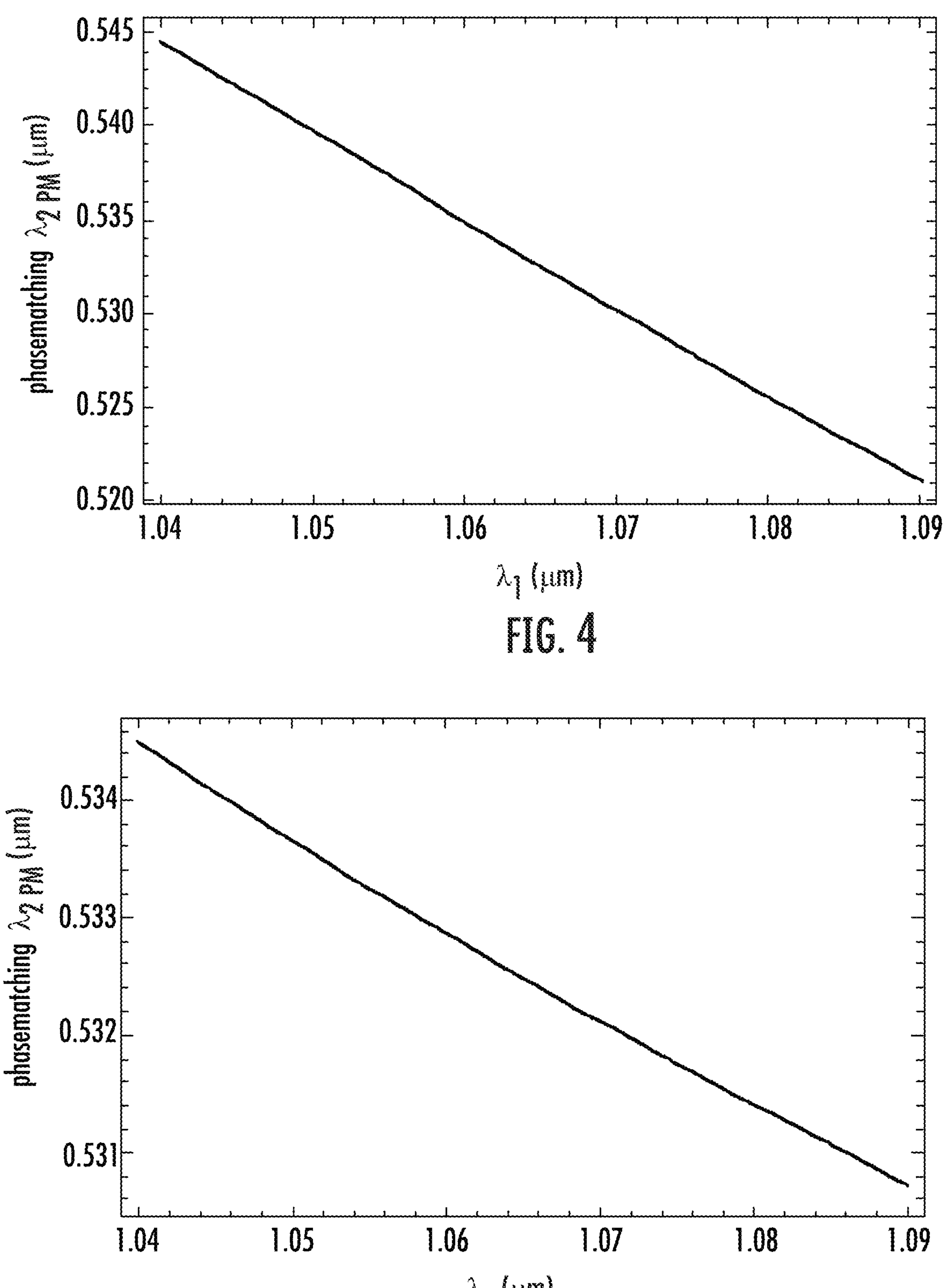
FIG. 4 is a plot representing variation of a phase-matching wavelength of the second optical wave as the function of the wavelength of the first optical wave for non-linear interaction in type-I BBO crystal.
FIG. 5 is a plot representing variation of a phase-matching wavelength of the second optical wave as the function of the wavelength of the first optical wave for non-linear interaction in 'oee' type-II BBO crystal.

Using published Sellmeier equation for BBO (see K. Kato, Proc SPIE 7582 paper 1L, 2010), and the nominal phase-matching orientation of the crystal 126 of θ=31.3 degrees (φ is not specified for the purpose of phase-matching as BBO is a uniaxial crystal), and having both the IR light 106 and the green light 110A polarized perpendicularly to the C-axis of the crystal, the phase-matching wavelength $\lambda_{2PM}$ is calculated and plotted in FIG. 4. The corresponding chirp rate for green pulse of the beam 110A is larger in magnitude, $$\frac{\partial \lambda_{2PM}}{\partial \lambda_1} = -0.47,$$

coincidentally very similar in value to that of the case of type-I LBO conversion discussed above.

Example of Type-II Phasematching in BBQ

There are two possible type-II phase-matching situations, with only green light 110A or only IR light 106 being polarized perpendicularly to the C-axis of the BBO crystal 126. The 'oee' configuration, in which only the IR light 106 is polarized perpendicularly to the C-axis, occurs at θ=59.6 degrees. The phase-matching wavelength $\lambda_{2PM}$ in this case is calculated and plotted in FIG. 5. In this case, the corresponding chirp rate for green light 110A is larger in magnitude, $$\frac{\partial \lambda_{2PM}}{\partial \lambda_1} = -0.08,$$

by a surprisingly small value.

Figure 6:
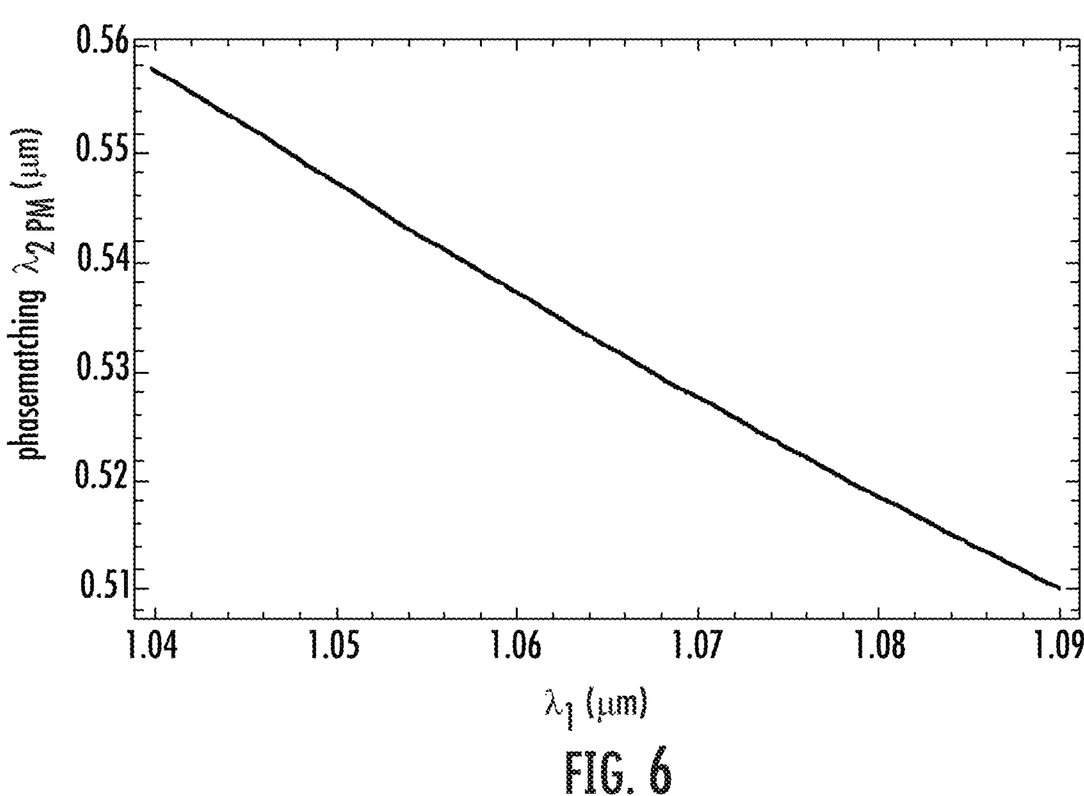
FIG. 6 is a plot representing variation of a phase-matching wavelength of the second optical wave as the function of the wavelength of the first optical wave for non-linear interaction in 'eoe' type-II BBO crystal.

The 'eoe' configuration, in which only green light 110A is polarized perpendicularly to the C-axis of the BBO crystal 126, occurs at θ=38.5 degrees. The result is shown in FIG. 6. In this case, the corresponding chirp rate for green light 110A is larger in magnitude, $$\frac{\partial \lambda_{2PM}}{\partial \lambda_1} = -0.95,$$

but not by as much as in the case for type-II LBO.

As the person of skill will readily conclude from the presented examples, the appropriate chirp rate is different for different phase-matching configurations and/or different non-linear materials but remains a reasonably linear function for all discussed thus far cases.

Figure 7:
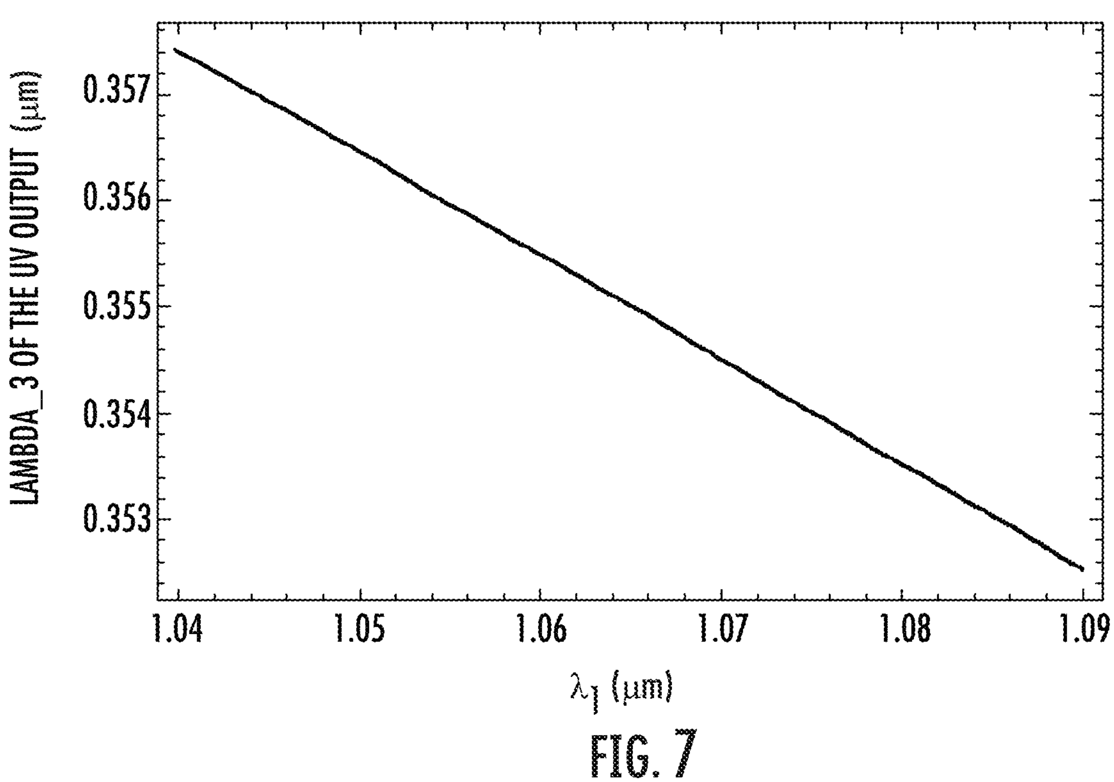
FIG. 7 is a plot representing variation of the wavelength of the UV light formed as a results of phase-matched interaction of the first and second optical waves in case of type-I BO SFM.

Example of Methodology of Maintaining the Phase-Matching Condition Throughout the Duration of the Chirped Pulse As pointed out earlier, the frequency of the sum-frequency does not remain constant during the duration of the pulse, and the UV output at $\lambda_3$ (beam 134) is chirped in a direction opposite to that in which the IR pulse of the beam 106 is chirped. The variation of the UV wavelength in case of LBO type-I SFM (in which green is chirped at a rate shown in FIG. 2) is shown in FIG. 7.

While the IR wavelength of the fundamental beam 106 changes due to the chirp from, for example, 1040 nm to 1090 nm (that is by 50 nm), the wavelength of the second harmonic light of the beam 110, 110A should be varied from 544 nm to 520 nm (by 24 nm), and the resulting UV wavelength of the beam 134 varies from 357 nm to 352 nm—that is, within a range that is significantly narrower than the simple third harmonic would (from about 346 nm to about 363 nm).

Example of a Related Embodiment of the Proposed Methodology

To attain proper chirp rates of the two non-linearly interacting beams with respect to each other, one can independently compress the pulses of these two beams. In such a case, however, the optical throughput may be different from what is desired. Instead, a skilled person may choose to affect the chirp rates by employing the group dispersion of some pre-determined materials. For example, sapphire crystal is known to have a large group velocity dispersion, and down-chirped pulse can be up-chirped within reasonable propagation length within such a crystal. The sign of group velocity dispersion is usually positive (for example, in visible to near infrared region including sapphire) so the pulses will have to be down-chirped before entering such a crystal.

Figure 8:
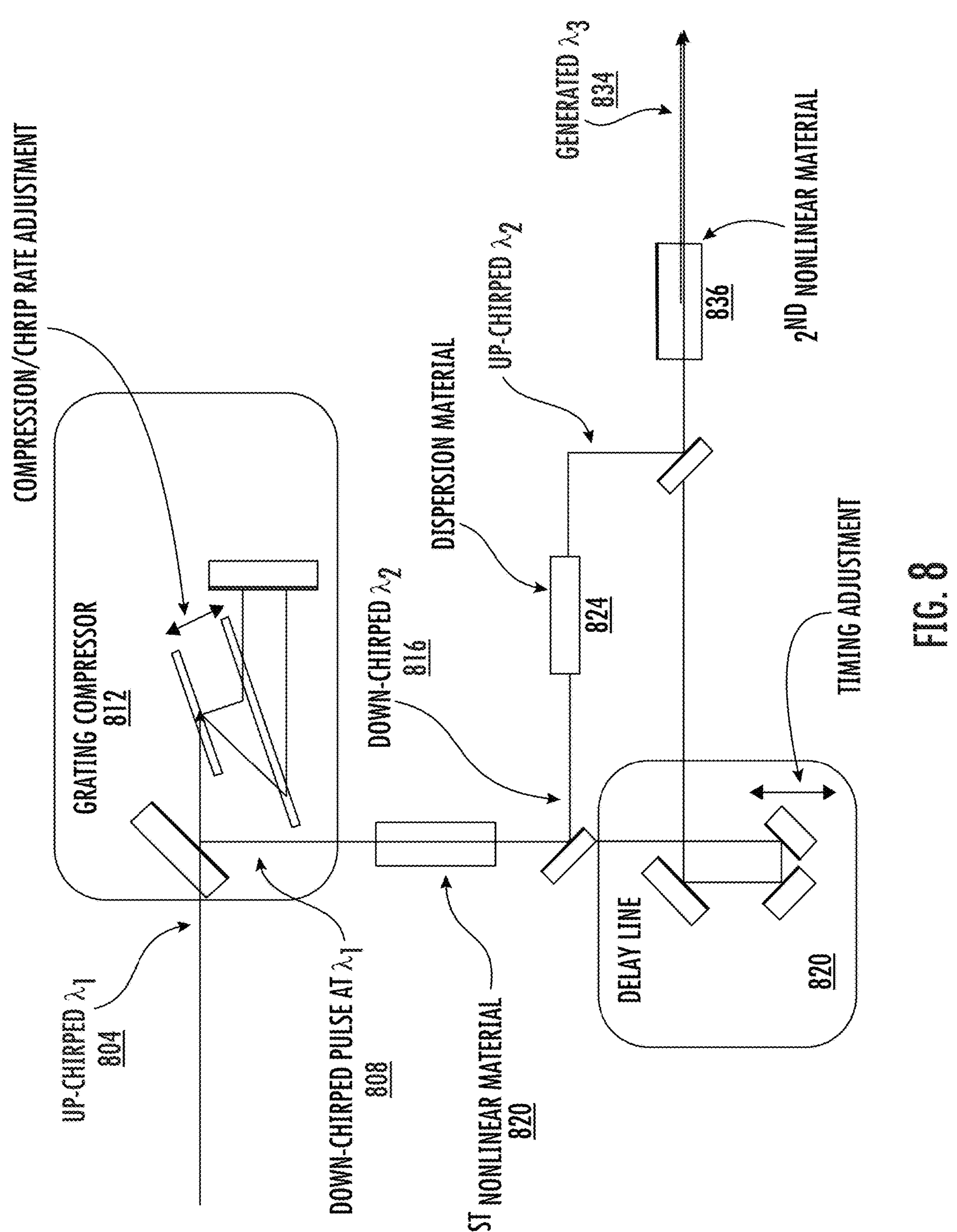
FIG. 8 is a schematic of an optical system according to a related embodiment of the invention.

For example, referring to FIG. 8 and to the situation of the IR (the fundamental harmonic) and the SH (second harmonic) interacting beams considered above—if the initially up-chirped 10 ps long pulse of the IR light 804 is down chirped (see beam 808) in the grating compressor 812 within its bandwidth ranging from 1050 nm to 1070 nm, the green light 816 generated at the first non-linear material 820 chirps from 525 nm to 535 nm in the same period of time. The beams of light 808, 816 are then spatially separated from one another, with one of them being passed through the time delay line 820 and another—through the dispersion material 824, after which the beams are collinearly recombined to generate the sought-after resulting UV beam 834 within the second non-linear crystal 836.

Here, in order to implement the idea of the invention, the embodiment of the optical system of FIG. 8 includes at least a pulse compressor system (that contains at least one pulse compressor that is configured to receive first chirped pulses of light at its input and to over-compress such first chirped pulses of light to form, at an output of the pulse compressor system, first over-compressed chirped pulses of light having a chirp direction opposite to that of the first chirped pulses of light; a first non-linear optical medium positioned across a second axis to receive the first over-compressed chirped pulses of light from the pulse compressor system and configured to transform a portion of light carried by the first over-compressed chirped pulses into second chirped pulses of light at a second nominal wavelength, with the second chirped pulses of light having the same chirp direction as that of the first over-compressed chirped pulses of light; an optical material configured to introduce group velocity dispersion to light passing therethrough, which material is positioned to receive and transmit therethrough the second chirped pulses of light but not the first over-compressed chirped pulses of light and to output modified second chirped pulses of light (here, a chirp direction of the modified second chirped pulses of light is opposite to that of the second chirped pulses of light); a first optical sub-system configured to spatially overlap a beam carrying the over-compressed first chirped pulses of light with a beam carrying the modified second chirped pulses of light and with an output axis at multiple points of the output axis; and a second optical sub-system configured to synchronize a time of arrival of the over-compressed first chirped pulses of light with a time of arrival of the modified second chirped pulses of light at a chosen location at the output axis.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. Other specific examples of the meaning of the terms "substantially", "about", and/or "approximately" as applied to different practical situations may have been provided elsewhere in this disclosure.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

For the purposes of this disclosure and the appended claims, the expression of the type "element A and/or element B" is defined to have the meaning that covers embodiments having element A alone, element B alone, or elements A and B taken together and, as such, is intended to be equivalent to "at least one of element A and element B".

While the invention is described through the above-described specific non-limiting embodiments, it will be understood by those of ordinary skill in the art that modifications to, and variations of, the illustrated embodiments may be made without departing from the inventive concepts disclosed herein. The disclosed aspects may be combined in ways not listed above. Accordingly, the invention should not be viewed as being limited to the disclosed embodiment(s).

What is claimed is:

1. An optical system comprising:

an input non-linear optical medium positioned across an input axis and configured to transform a portion of light, carried by first chirped pulses of light at a first nominal wavelength that have been received by the input non-linear optical medium, into second chirped pulses of light at a second nominal wavelength, a pulse compressor system including at least one pulse compressor that is configured to receive one of the first chirped and second chirped pulses of light but not the other of said first chirped and second chirped pulses of light and to over-compress said one of the first chirped and second chirped pulses of light to form, at an output of the pulse compressor system, over-compressed chirped pulses of light that have a chirp direction opposite to that of the first chirped pulses of light;

a first optical sub-system configured to spatially overlap a beam carrying the over-compressed chirped pulses of light with (a) a beam carrying the other of said first chirped and second chirped pulses of light and with (b) an output axis at multiple points of the output axis; and a second optical sub-system configured to synchronize a time of arrival of the over-compressed pulses of light and a time of arrival of the other of said first chirped and second chirped pulses of light at a chosen location, the chosen location being at the output axis.

2. An optical system according to claim 1, further comprising an output non-linear optical medium positioned across the output axis at said chosen location.

3. An optical system according to claim 2, configured to maintain a phase-matching condition in a region of interaction of said over-compressed chirped pulses of light and the other of said first chirped and second chirped pulses of light with the output non-linear optical medium substantially at every instant of time within a duration of at least one of said over-compressed chirped pulses of light and the other of said first chirped and second chirped pulses of light.

4. An optical system according to claim 3, further comprising a third optical sub-system configured to spatially separate the first chirped pulses of light from the second chirped pulses of light and disposed between the input non-linear optical medium and the at least one pulse compressor.

5. An optical system according to claim 2, wherein the pulse compressor system is configured to ensure that a chirp rate of the over-compressed chirped pulses of light and a chirp rate of the other of said first chirped and second chirped pulses of light are substantially equal at least at said chosen location.

6. An optical system according to claim 5, configured to maintain a phase-matching condition in a region of interaction of said over-compressed chirped pulses of light and the other of said first chirped and second chirped pulses of light with the output non-linear optical medium substantially at every instant of time within a duration of at least one of said over-compressed chirped pulses of light and the other of said first chirped and the second chirped pulses of light.

7. An optical system according to claim 6, further comprising a third optical sub-system configured to spatially separate the first chirped pulses of light from the second chirped pulses of light and disposed between the input non-linear optical medium and the at least one pulse compressor.

8. An optical system according to claim 6, further comprising a third optical sub-system configured to spatially separate the first chirped pulses of light from the second chirped pulses of light and disposed between the input non-linear optical medium and the at least one pulse compressor.

9. An optical system according to claim 2, further comprising a third optical sub-system configured to spatially separate the first chirped pulses of light from the second chirped pulses of light and disposed between the input non-linear optical medium and the at least one pulse compressor.

10. An optical system according to claim 1, wherein the pulse compressor system is configured to ensure that a chirp rate of the over-compressed chirped pulses of light and a chirp rate of the other of said first chirped and second chirped pulses of light are substantially equal at least at said chosen location.

11. An optical system according to claim 10, further comprising a third optical sub-system configured to spatially separate the first chirped pulses of light from the second chirped pulses of light and disposed between the input non-linear optical medium and the at least one pulse compressor.

12. An optical system according to claim 1, further comprising a third optical sub-system configured to spatially separate the first chirped pulses of light from the second chirped pulses of light and disposed between the input non-linear optical medium and the at least one pulse compressor.

13. An optical system according to claim 12, further comprising a third optical sub-system configured to spatially separate the first chirped pulses of light from the second chirped pulses of light and disposed between the input non-linear optical medium and the at least one pulse compressor.

14. A method comprising:

with the use of the optical system according to claim 1 and employing (a) a first temporally chirped pulse of light that is characterized by a first pre-defined nominal optical wavelength, a first rate of chirp, and a first chirp directionality, and (b) a second temporally chirped pulse of light that is characterized by a second pre-defined nominal optical wavelength, a second rate of chirp, and a second chirp directionality, performing the following steps:

(i) over-compressing a chosen chirped pulse of the first and the second temporally chirped pulses in the pulse compression system to form an over-compressed chirped pulse with an over-compressed pulse chirp directionality that is opposite to a directionality of the chosen pulse; and (ii) spatially adjusting directions of propagation of corresponding beams of light that carry, respectively, the over-compressed chirped pulse and the other of the first and second temporally chirped pulses, with respect to a chosen axis to have said beams substantially spatially coincide with the chosen axis at multiple points thereof, while temporally synchronizing said over-compressed chirped pulse and the other of the first and second chirped pulses such as to have the over-compressed chirped pulse and the other of the first and second temporally chirped pulses spatially and temporally overlap at a chosen location on the the chosen axis.

15. A method according to claim 14, further comprising:

when an over-compressed chirp rate of the over-compressed chirped pulse and a chirp rate of the other of the first and second temporally chirped pulses are not equal to one another, varying at least one of the over-compressed chirp rate and said chirp rate of the other of the first and second chirped pulses to make magnitudes of the over-compressed chirp rate and said chirp rate of the other of the first and second temporally chirped pulses substantially equal to one another.

16. A method according to claim 15, wherein said varying includes passing the other of the first and second temporally chirped pulses through an auxiliary pulse de-chirping system that is independent from the pulse compression system or transmitting said other of the first and second pulses through a material possessing chromatic dispersion.

17. A method according to claim 14, further comprising:

at said chosen location, generating a third pulse of light by non-linearly interacting the over-compressed chirped pulse with the other of the first and second chirped pulses.

18. A method according to claim 17, comprising:

transmitting said over-compressed chirped pulse of light and the other of the first and second temporally chirped pulses of light through an output non-linear optical medium positioned across the chosen axis at said chosen location.

19. A method according to claim 14, further comprising:

generating the second temporally chirped pulse of light by interacting the first temporally chirped pulse of light with an input non-linear optical medium positioned in front of the pulse compression system.

20. A method according to claim 19, further comprising: prior to said over-compressing, spatially separating light beams carrying, respectively, said first and second chirped pulses of light.

* * * * *